United States Patent
Kim et al.

(10) Patent No.: US 9,620,755 B2
(45) Date of Patent: Apr. 11, 2017

(54) SECONDARY BATTERY MANUFACTURING METHOD, SECONDARY BATTERY, WELDING APPARATUS THEREOF

(71) Applicant: NISSAN MOTOR CO., LTD., Kanagawa (JP)

(72) Inventors: Taewon Kim, Yokohama (JP); Kazumi Hisajima, Yamato (JP); Yasuhiro Sawada, Isehara (JP); Miyuki Nakai, Yokohama (JP); Akiko Kinoshita, Yokohama (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 281 days.

(21) Appl. No.: 14/371,489

(22) PCT Filed: Jan. 11, 2013

(86) PCT No.: PCT/JP2013/050374
§ 371 (c)(1),
(2) Date: Jul. 10, 2014

(87) PCT Pub. No.: WO2013/105630
PCT Pub. Date: Jul. 18, 2013

(65) Prior Publication Data
US 2015/0303426 A1    Oct. 22, 2015

(30) Foreign Application Priority Data

Jan. 12, 2012    (JP) ................... 2012-004215

(51) Int. Cl.
*H01M 4/02*    (2006.01)
*H01M 2/16*    (2006.01)
(Continued)

(52) U.S. Cl.
CPC ........... *H01M 2/1673* (2013.01); *B29C 65/08* (2013.01); *B29C 65/8215* (2013.01);
(Continued)

(58) Field of Classification Search
CPC ....................................... H01M 4/26
See application file for complete search history.

(56) References Cited

U.S. PATENT DOCUMENTS 5,605,771 A * 2/1997 Eidler ............... H01M 10/0413
429/152
5,741,608 A    4/1998 Kojima et al.
(Continued)

FOREIGN PATENT DOCUMENTS

EP    2399723 A1    12/2011
JP    H05-290822 A    11/1993
(Continued)

*Primary Examiner* — Jacob Marks
(74) *Attorney, Agent, or Firm* — Young Basile Hanlon & MacFarlane, P.C.

(57) ABSTRACT

A part has separator layers of resin laminated on each other with heat-resistant layers interposed among them and a sheath (laminated sheet) laid on each side of the laminated separator layers. The part is held, pressurized, and vibrated by a pressure vibrator and a jig receiver. The pressure vibrator and jig receiver are provided with projections that pressurize, vibrate, and break the heat-resistant layers, thereby melting and welding together the resin of the separator layers at the broken part.

6 Claims, 10 Drawing Sheets

(51) Int. Cl.
  *B29C 65/08* (2006.01)
  *B29C 65/00* (2006.01)
  *H01M 2/02* (2006.01)
  *H01M 10/04* (2006.01)
  *H01M 10/0525* (2010.01)
  *B29C 65/82* (2006.01)
  *H01M 10/0585* (2010.01)
  *B29L 31/34* (2006.01)
  *B29C 65/56* (2006.01)

(52) U.S. Cl.
  CPC ...... *B29C 65/8223* (2013.01); *B29C 66/1122* (2013.01); *B29C 66/21* (2013.01); *B29C 66/43* (2013.01); *B29C 66/433* (2013.01); *B29C 66/71* (2013.01); *B29C 66/727* (2013.01); *B29C 66/72325* (2013.01); *B29C 66/7311* (2013.01); *B29C 66/73113* (2013.01); *B29C 66/81429* (2013.01); *B29C 66/81433* (2013.01); *B29C 66/8322* (2013.01); *H01M 2/02* (2013.01); *H01M 2/0202* (2013.01); *H01M 2/0212* (2013.01); *H01M 2/0237* (2013.01); *H01M 2/1686* (2013.01); *H01M 10/04* (2013.01); *H01M 10/0404* (2013.01); *H01M 10/0436* (2013.01); *H01M 10/0525* (2013.01); *B29C 65/56* (2013.01); *B29C 66/304* (2013.01); *B29C 66/81422* (2013.01); *B29L 2031/3468* (2013.01); *H01M 2/0287* (2013.01); *H01M 10/0585* (2013.01); *Y02P 70/54* (2015.11)

(56) References Cited

U.S. PATENT DOCUMENTS

| | | | |
|---|---|---|---|
| 7,163,565 | B2 | 1/2007 | Yanagawa et al. |
| 2002/0174933 | A1* | 11/2002 | Solinski ............... B29C 65/08 156/73.4 |
| 2011/0036480 | A1 | 2/2011 | Kropf et al. |
| 2012/0321939 | A1* | 12/2012 | Yamaguchi ......... H01M 2/0222 429/162 |

FOREIGN PATENT DOCUMENTS

| | | |
|---|---|---|
| JP | 06-079784 A | 3/1994 |
| JP | 2004-158344 A | 6/2004 |
| JP | 3584583 B2 | 11/2004 |
| JP | 2005-183594 A | 7/2005 |
| JP | 2012-066546 A | 4/2012 |
| KR | 2010-0094898 A | 8/2010 |
| TW | I268004 B | 12/2006 |

* cited by examiner

TENSILE STRENGTH (N)

SECONDARY BATTERY MANUFACTURING METHOD, SECONDARY BATTERY, WELDING APPARATUS THEREOF

CROSS REFERENCE TO RELATED APPLICATION

The present application claims priority to Japanese Patent Application No. 2012-004215, filed Jan. 12, 2012, and incorporated herein in its entirety.

TECHNICAL FIELD

The present invention relates to a secondary battery manufacturing method, a secondary battery, and a welding apparatus thereof.

BACKGROUND

Among secondary batteries, there is one having a laminated electrode body that includes positive and negative electrodes laminated on each other with a separator interposed between them. One of the secondary batteries of this sort developed in recent years and aiming to improve heat resistance inside the secondary battery is disclosed in Japanese Patent Publication No. 3584583 (Patent Literature 1). This secondary battery employs a separator whose face opposing to an electrode (e.g. a positive electrode) is provided with a heat-resistant layer. In the secondary battery, the positive electrode, the heat-resistant-layer-provided separator, and a negative electrode are laminated on one another in this order.

Another secondary battery is disclosed in Japanese Unexamined Patent Application Publication No. 2004-158344 (Patent Literature 2). To prevent a separator from moving inside the secondary battery, this related art holds an end of the separator between sheaths and welds the separator and sheaths together to fix them.

SUMMARY

Suppose that the heat-resistant-layer-provided separator of the Patent Literature 1 is used with the sheaths of the Patent Literature 2 to hold and weld an end of the separator between the sheaths. The heat-resistant layer is strong against heat and does not melt at a temperature that may be sufficient to thermally weld the resin sheaths and separator to each other. Namely, using the heat-resistant-layer-provided separator has a problem that an end of the separator and the sheaths are hardly welded or fixed together.

The present invention provides a secondary battery manufacturing method capable of manufacturing a secondary battery that includes resin separators provided with heat-resistant layers and capable of surely welding the separators and sheaths together, or the separators themselves together.

With the use of the manufacturing method, the present invention also provides a secondary battery in which heat-resistant-layer-provided separators and sheaths, or the heat-resistant-layer-provided separators themselves are surely fixed together. Further, the present invention provides a welding apparatus capable of surely welding heat-resistant-layer-provided separators and sheaths together, or the heat-resistant-layer-provided separators themselves together.

According to a technical aspect of the present invention, the secondary battery manufacturing method includes employing a welding jig that has a pressure vibrator, a jig receiver arranged at a position opposing to the pressure vibrator, and projections formed on at least one of the pressure vibrator and jig receiver. With the pressure vibrator and jig receiver, the method holds and pressurizes in a laminated direction and vibrates a welding part having a structure in which a plurality of separator layers made of resin and heat-resistant layers interposed among the separator layers are laminated on one another. The pressurization and vibration break the heat-resistant layers in the welding part and weld together the resin of the separator layers that joins together in the broken part.

According to a second technical aspect of the present invention, the secondary battery is manufactured according to the above-mentioned secondary battery manufacturing method and includes sheaths each having a resin layer on the surface thereof and a power generation element covered with the sheaths. The power generation element includes a lamination of a positive electrode, a negative electrode, and a heat-resistant-layered separator interposed between the positive and negative electrodes. A part of an end of the separator is held between peripheral parts of the sheaths. The heat-resistant layer positioned at the part held between the sheaths is broken so that, at the broken part, the resin layers of the sheaths and resin of the separator weld together.

According to a third technical aspect of the present invention, the secondary battery is formed according to the above-mentioned secondary battery manufacturing method and includes a bagged electrode having one of positive and negative electrodes between two heat-resistant-layered separators that are formed into a bag. On an outer side of the electrode contained in the bag-like heat-resistant-layered separators, the heat-resistant layers are broken at a part of an area where the separators overlap, and at the broken part, the resin of the separators welds together.

According to a fourth technical aspect of the present invention, the welding apparatus includes a welding jig having a pressure vibrator, a jig receiver positioned to face the pressure vibrator, and projections arranged on at least one of the pressure vibrator and jig receiver and an ultrasonic vibrator to vibrate at least the pressure vibrator. In the welding apparatus, the pressure vibrator and jig receiver hold and pressurize in a laminated direction and vibrate a welding part having a structure in which a plurality of separator layers of resin and heat-resistant layers interposed among the separator layers are laminated on one another, thereby breaking the heat-resistant layers in the welding part and welding together the resin of the separator layers that joins together in the broken part.

BRIEF DESCRIPTION OF DRAWINGS

FIG. 3 is an explanatory view of a bagged positive electrode (bagged electrode) adopted in the secondary battery according to the embodiment, in which

FIG. 5 is a view explaining an internal structure of the secondary battery according to the embodiment, in which

FIG. 6 is a schematic view explaining an ultrasonic welding apparatus according to an embodiment of the present invention, in which

FIG. 7 is a view illustrating a work contact face of a pressure vibrator of the ultrasonic welding apparatus, in which

FIG. 8 is an enlarged sectional view illustrating a state that a work is held with a welding jig of the ultrasonic welding apparatus, in which

FIG. 11 is an enlarged sectional view illustrating a state that a work is held with the welding jig of the ultrasonic welding apparatus, in which

DETAILED DESCRIPTION OF EMBODIMENTS

An embodiment of the present invention will be explained with reference to the accompanying drawings. In the explanation of the drawings, the same elements are represented with the same reference marks to omit overlapping explanation. The dimensions and ratios of parts illustrated in the drawings are exaggerated for the sake of explanation and frequently differ from actual ones.

A secondary battery according to the embodiment will be explained, and thereafter, a welding apparatus for manufacturing the secondary battery, a secondary battery manufacturing method employing the welding apparatus, and a bagged electrode manufacturing method will be explained.

Figure 1:
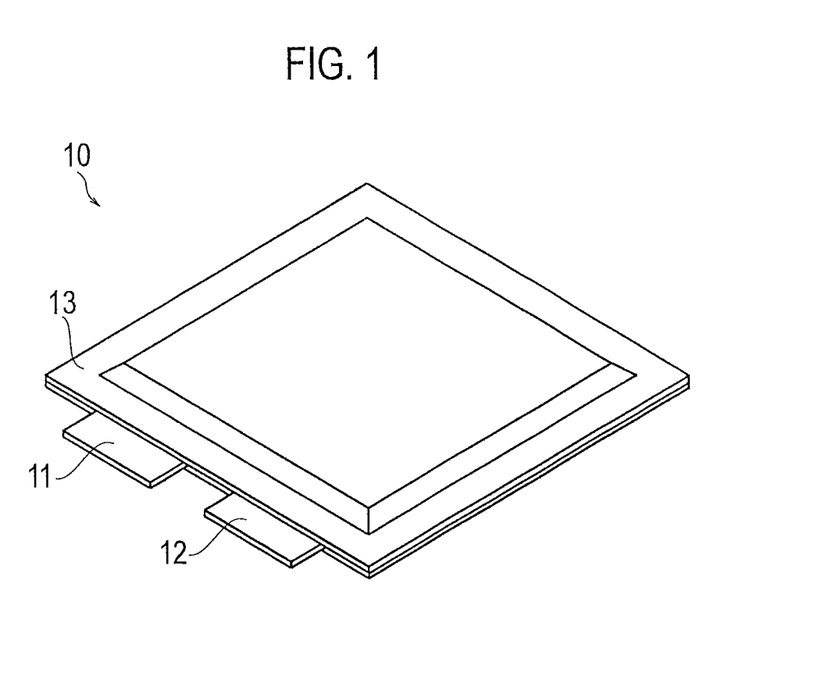
FIG. 1 is a perspective view illustrating the exterior of a secondary battery according to an embodiment of the present invention.
Figure 2:
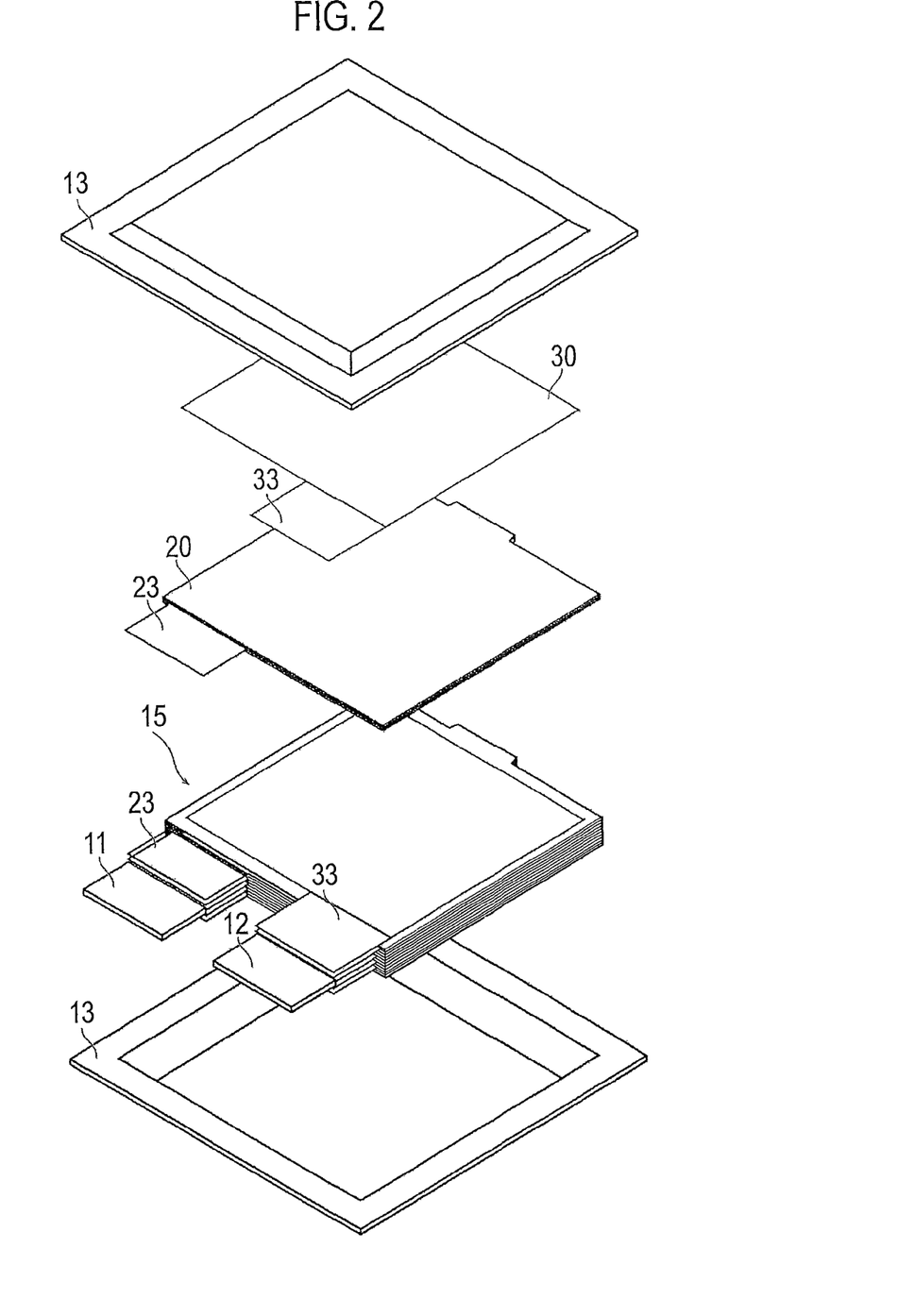
FIG. 2 is an exploded perspective view illustrating the secondary battery according to the embodiment.
Figure 3A:
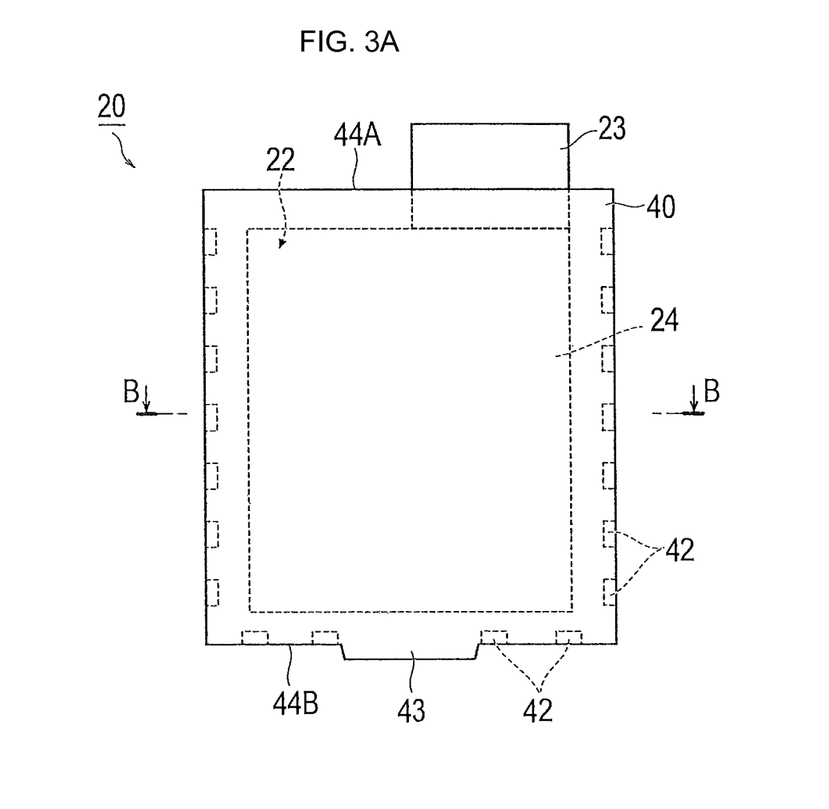
FIG. 3(A) is a plan view and FIG. 3(B) is a sectional view along a line B-B of FIG. 3(A).
Figure 3B:
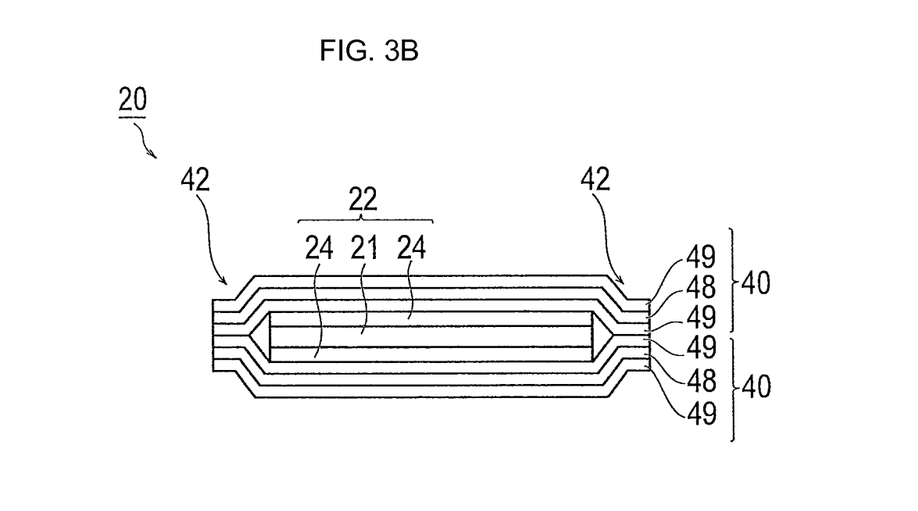
Figure 4:
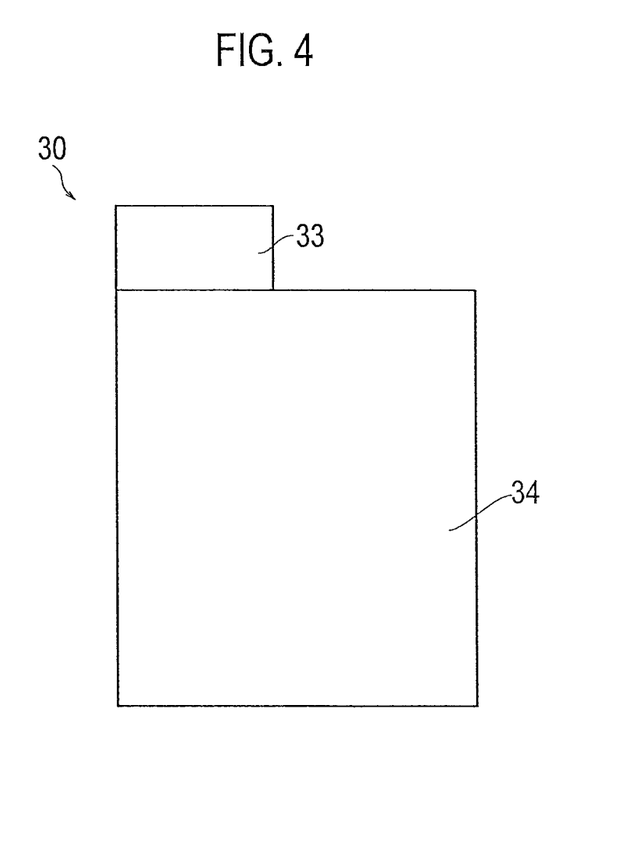
FIG. 4 is a plan view of a negative electrode adopted in the secondary battery according to the embodiment.
Figure 5A:
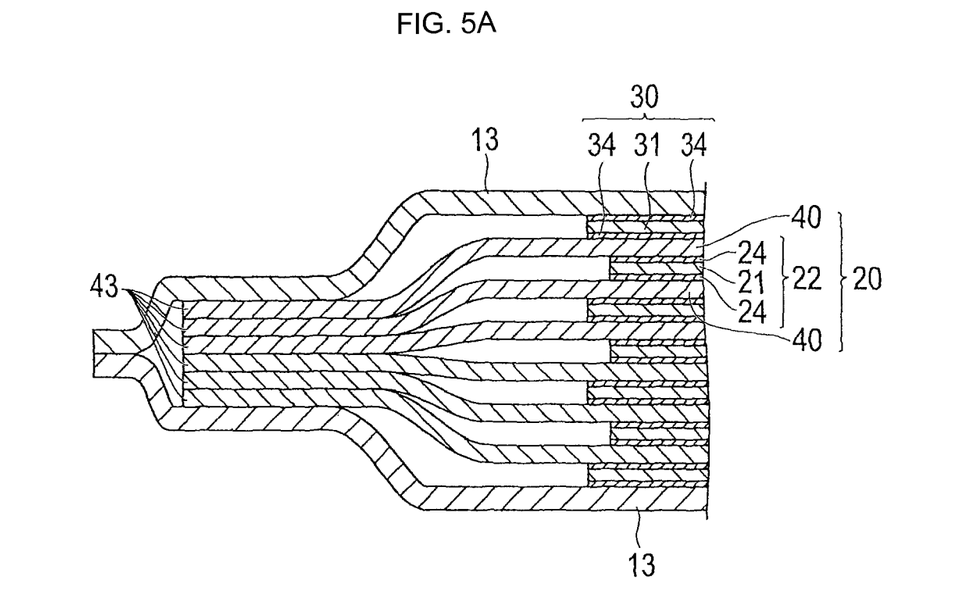
FIG. 5(A) is a sectional view explaining an essential part of the internal structure of the secondary battery according to the embodiment and FIG. 5(B) is an enlarged sectional view of an engaging part at an end of the secondary battery illustrated in FIG. 5(A).
Figure 5B:
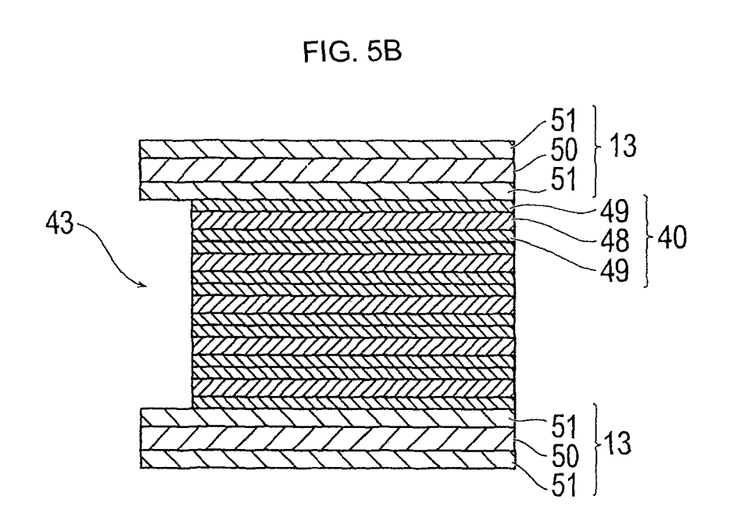

FIG. 1 is a perspective view illustrating the exterior of a secondary battery according to an embodiment. FIG. 2 is an exploded perspective view of the secondary battery according to the present embodiment. FIG. 3 is an explanatory view illustrating a bagged positive electrode (bagged electrode) adopted in the secondary battery according to the present embodiment, in which FIG. 3(A) is a plan view and FIG. 3(B) is a sectional view along a line B-B of FIG. 3(A). FIG. 4 is a plan view of a negative electrode adopted in the secondary battery according to the present embodiment. FIG. 5 is a view explaining an internal structure of the secondary battery according to the present embodiment, in which FIG. 5(A) is a sectional view explaining an essential part of the internal structure of the secondary battery according to the present embodiment and FIG. 5(B) is an enlarged sectional view of an engaging part at an end of the secondary battery illustrated in FIG. 5(A).

The secondary battery 10 has, as illustrated in FIG. 1, a flat square shape. A positive electrode lead 11 and a negative electrode lead 12 are led out from the same end of sheaths 13. The sheaths 13 contain a power generation element 15 that achieves charge and discharge reactions.

The power generation element 15 is formed with, as illustrated in FIG. 2, bagged positive electrodes 20 and negative electrodes 30 that are alternately stacked on each other.

The bagged positive electrode 20 has, as illustrated in FIG. 3, two separators provided with heat-resistant layer 40 that are joined together along edges thereof into a bag to contain a positive electrode 22. Between the positive electrode 22 and a separator layer 48 made of resin, there is a heat-resistant layer 49. The separator layer 48 and heat-resistant layers 49 form a three-layer structure made by coating each face of the resin separator with ceramics (heat-resistant material) serving as the heat-resistant layer 49. The material formed by coating each face of the separator layer with the heat-resistant layer is referred to as the separator provided with heat-resistant layer 40.

The separator layer 48 is made of polyolefin-based porous resin such as polyethylene and polypropylene.

The positive electrode 22 has a rectangular shape and includes a very thin sheet-like positive electrode collector (collecting foil) 21 and a positive electrode active material layer 24 formed on each face of the positive electrode collector 21. The positive electrode active material layer 24 is extended over the positive electrode 22 except for a positive electrode tab 23.

The two separators with heat-resistant layer 40 are joined together at each end part, i.e., joining part 42 into a bag. Accordingly, the two separators with heat-resistant layer 40 each are larger than the positive electrode 22 (except for the positive electrode tab 23). A manufacturing method of the bagged positive electrode 20 will be explained later.

From a side 44A that linearly extends along the bag-like separators with heat-resistant layer 40, the positive electrode tab 23 is pulled out, and on a side 44B opposite to the side 44A, a partly protruding engaging part 43 is formed. The engaging part 43 engages with the sheaths 13 within the sheaths 13, thereby fixing the power generation element 15 to the sheaths 13.

The negative electrode 30 has, as illustrated in FIG. 4, a rectangular shape and includes a very thin sheet-like negative electrode collector (collecting foil) 31 and a negative electrode active material layer 34 formed on each face of the negative electrode collector 31. The negative electrode active material layer 34 is extended over the negative electrode 30 except for a negative electrode tab 33.

The power generation element 15 includes the negative electrodes 30 and bagged positive electrodes 20 that are alternately stacked on one another. This forms a laminated structure illustrated in FIG. 5 in which the heat-resistant-layer-provided separator 40 is interposed between the negative electrode 30 and the positive electrode 22. At an end part illustrated in FIG. 5(A), the sheaths 13 are sealed with the engaging parts 43 of the heat-resistant-layered separators 40 held between the sheaths 13. In the stacked state, the positive electrode tabs 23 and negative electrode tabs 33 are connected to the positive electrode lead 11 and negative electrode lead 12, respectively (refer to FIG. 2). In FIG. 5, the separator layer 48 and heat-resistant layers 49 of each heat-resistant-layered separator 40 are omitted.

When the negative electrode 30 is laid on the bagged positive electrode 20, the negative electrode active material layer 34 is larger by one size in a plan view than the positive electrode active material layer 24 of the positive electrode 22.

At the end part illustrated in FIG. 5(A), the engaging part 43 of each heat-resistant-layered separator 40 is held between and fixed to the sheaths 13. FIG. 5(B) is an enlarged sectional view of the engaging part 43.

The sheath 13 is, for example, a laminated sheet. As illustrated, the laminated sheet 13 includes a metal base material 50 and a resin layer 51 coated over each face of the base material 50. Sealing the sheaths 13 is usually carried out by thermal welding. The resin layer 51 of each laminated sheet melts when heat is applied thereto to weld overlapping portions together. This is the same as the related art (Patent Literature 2). If the separator has no heat-resistant layer, the sheaths 13 and the end part of each separator held between the sheaths 13 are heated so that the resin of the separators and the resin layers 51 of the sheaths 13 melt and weld together. The resin melts at a temperature of about 130 to 180 degrees centigrade.

On the other hand, the heat-resistant layer 49 is made of, for example, porous ceramics that may pass an electrolyte but, as the name suggests, is resistive against heat and does not melt at the temperature of about 130 to 180 degrees centigrade. The heat-resistant layer 49 is porous, and therefore, has a small thermal conductivity and good thermal insulation properties. A heat-resistant temperature of the heat-resistant layer is, for example, 800 degrees centigrade or greater.

Even if much heat is applied, the resin of the separator layer 48 and the resin layer 51 of the sheath 13, or the resin of the adjacent separator layers 48 never come into contact with each other because they are protected by the heat-resistant layer 49, and therefore, never weld together.

To deal with this problem, the embodiment pressurizes and vibrates a part (welding part) of the sheaths 13 where the engaging part 43 of each heat-resistant-layered separator 40 is held, to break the heat-resistant layers 49 and weld the welding part.

Now, pressurizing, vibrating, and welding the welding part where the sheaths 13 hold the engaging part 43 of each heat-resistant-layered separator 40 will be explained. A method of manufacturing a lithium ion secondary battery by alternately laminating the bagged positive electrodes 20 and negative electrodes 30 of the embodiment is a generally known method, and therefore, is not explained in more detail.

Materials such as positive electrode active material, negative electrode active material, collecting foils, and the like used for making the lithium ion secondary battery are standard materials, and therefore, are not explained.
(Welding Apparatus)

An apparatus used for vibrating and welding the sheaths that hold the engaging parts of the heat-resistant-layered separators will be explained. Here, the apparatus is referred to as an ultrasonic welding apparatus because it applies ultrasonic vibration while welding.

Figure 6A:
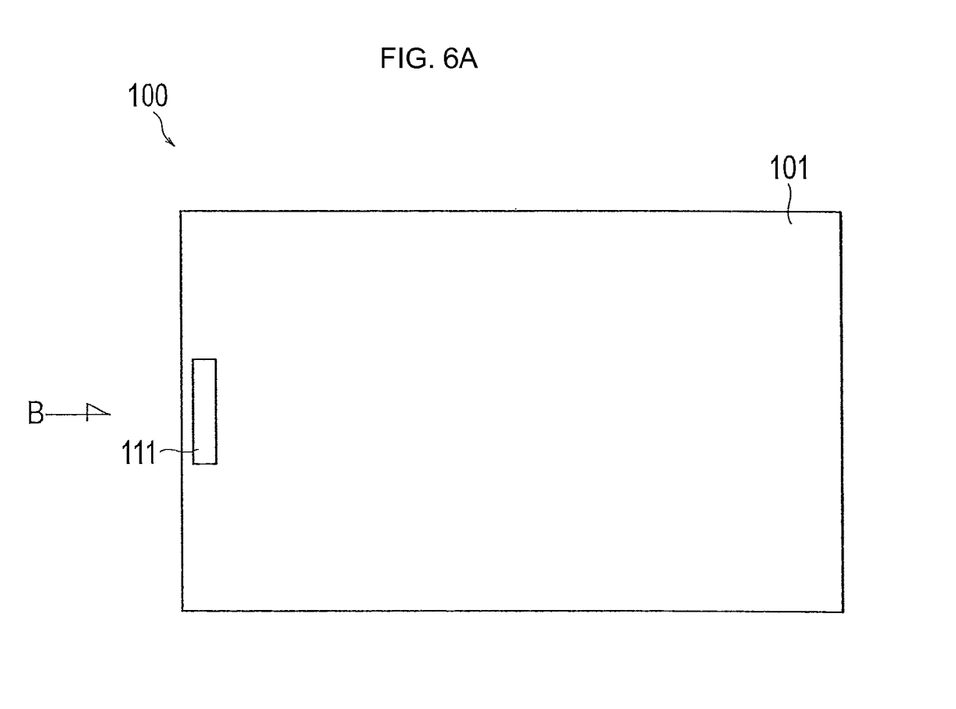
FIG. 6(A) is a plan view and FIG. 6(B) is a side view seen from the direction of an arrow B of FIG. 6(A).
Figure 6B:
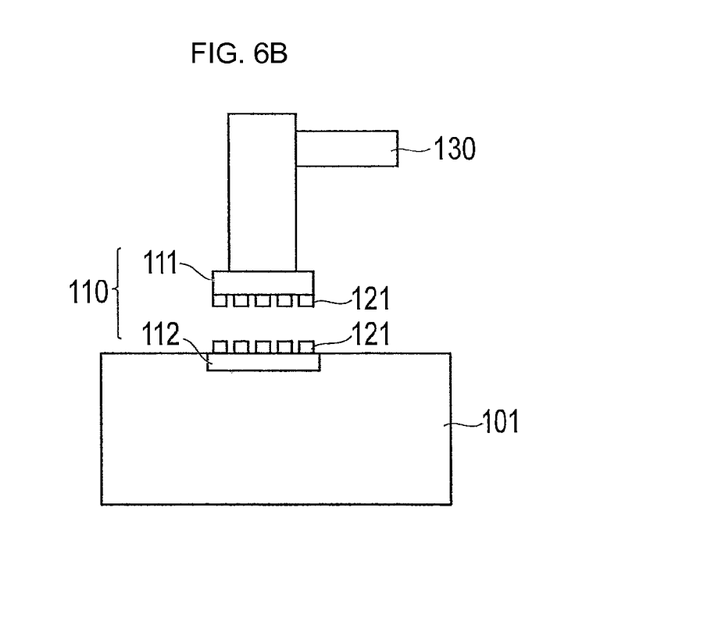

FIG. 6 is a schematic view explaining the ultrasonic welding apparatus according to an embodiment of the present invention, in which FIG. 6(A) is a plan view and FIG. 6(B) is a side view seen from the direction of an arrow B of FIG. 6(A).

The ultrasonic welding apparatus 100 has a stage 101 for placing a work thereon, a pressure vibrator 111 that is vertically movable on the stage 101, a jig receiver 112 that is positioned opposite to the pressure vibrator 111, and an ultrasonic vibrator 130 that vibrates the pressure vibrator 111. The pressure vibrator 111 and jig receiver 112 are collectively referred to as a welding jig 110.

The work includes the power generation element 15, which contains the bagged positive electrodes 20 and negative electrodes 30 laminated on each other, and the sheaths 13 that hold the power generation element 15 from each laminated-direction end. Namely, the work is a secondary battery before sealing the sheaths 13.

To seal the sheaths 13 of the work, the pressure vibrator 111 moves around the work and thermally welds the sheaths 13 made of resin. The pressure vibrator 111 is provided with the ultrasonic vibrator 130 for vibrating the pressure vibrator 111.

Figure 7A:
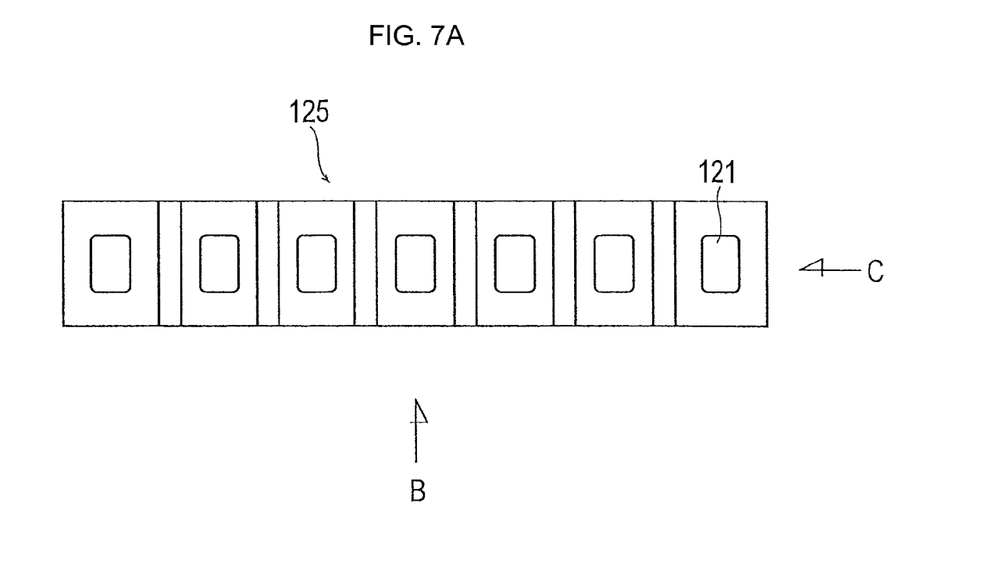
FIG. 7(A) is a plan view.
Figure 7B:
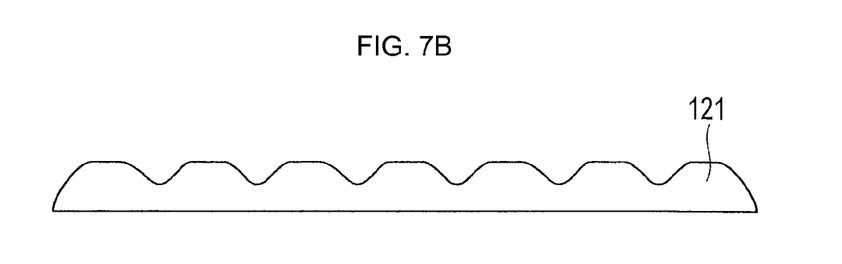
FIG. 7(B) is a side view seen from the direction of an arrow B of FIG. 7(A)
Figure 7C:
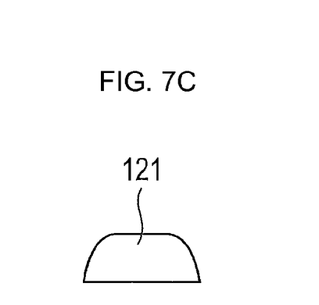
FIG. 7(C) is a side view seen from the direction of an arrow C of FIG. 7(A).

A contact face of the pressure vibrator 111 is an irregular face 125 having projections 121. FIG. 7 is a view illustrating the work contact face 125 of the pressure vibrator 111, in which FIG. 7(A) is a plan view, FIG. 7(B) is a side view seen from the direction of an arrow B of FIG. 7(A), and FIG. 7(C) is a side view seen from the direction of an arrow C of FIG. 7(A).

As illustrated in FIG. 7, the work contact face 125 of the pressure vibrator 111 is the irregular face 125 having a plurality of projections 121. A front end of each projection 121 is shaped into a circular arc or is chamfered. As will be explained later, roundness at the front end of each projection 121 removes broken part of the heat-resistant layer 49 so that the separator layer 48 made of resin may easily come into contact with another. The circular arc shape or the chamfered part functions not to injure the surface of the sheath 13 when vibrating.

The dimensions (length×width in plan view) and height of each projection 121 may properly be set according to the thickness of the part (welding part) to weld. When welding the sheaths 13 and the engaging parts 43 of a plurality of the heat-resistant-layer-provided separators 40, the height may be equal to or greater than the thickness of the stacked part. Namely, the height of the projection 121 must be equal to or greater than the thickness of the welding part and must be easy to manufacture (fabricate). The height may be sufficient if it is about twice as large as the thickness of the welding part.

The chamfering of the projection 121 is dependent on the dimensions and height thereof. The chamfering must be sized so that, when pressurizing, the projection 121 pushes off broken part of the heat-resistant layers. The separator layer 48 is made of resin and is flexible, and therefore, fragments (crushed fragments) created when the hard heat-resistant layer 49 is broken are pushed along the roundness of the projection 121 toward the periphery of the projection 121 where pressurizing force is relatively small. Taking such action into consideration, the chamfering quantity of the projection 121 is determined. The heat-resistant-layered separators 40 and the two sheaths 13 that hold the separators 40 between them have a total thickness of, for example, 700 micrometers. To weld this, it is preferable that the chamfering quantity of the projection 121 is about 1 to 2 millimeters.

The overall size (the size of the work contact part) of the pressure vibrator 111 is set not to break the electrodes contained in the sheaths 13 when welding a peripheral part of the sheaths 13. For this, the pressure vibrator 111 must be smaller than a distance from an edge of the electrodes in the sheaths 13 to an edge of the sheaths 13. It is acceptable if the pressure vibrator 111 protrudes from the edge of the sheaths 13.

In FIG. 6, the pressure vibrator 111 is movable on the stage 101. Namely, the pressure vibrator 111 and work move relative to each other on the stage 101 along the periphery of the sheath 13 and the peripheries of the sheaths 13 are sealed together.

On the stage 101, the jig receiver 112 is arranged at a position opposing to the pressure vibrator 111. The surface of the jig receiver 112 is an irregular face having projections 121 positioned to face the projections 121 of the pressure vibrator 111. The dimensions and height of each projection 121 of the jig receiver 112 are similar to those of the projection 121 of the pressure vibrator 111. Namely, it is sufficient if the height of the projection 121 is higher than the thickness of the welding part. It is sufficient if the jig receiver 112 is positioned to face the pressure vibrator 111.

Considering that the peripheries of the sheaths 13 are entirely welded, only the pressure vibrator 111 may be moved and the jig receiver 112 may be arranged entirely along the locus of the pressure vibrator 111. The jig receiver 112 may be configured to move together with the pressure vibrator 111. In this case, the work is fixed to the stage 101 and around which the pressure vibrator 111 and jig receiver 112 are moved together. Instead, the work fixed to the stage 101 may be moved between the pressure vibrator 111 and the jig receiver 112 that are fixed. In the latter case, the welding part is set to protrude from the stage and the periphery of the protruding part is held and welded by the pressure vibrator 111 and jig receiver 112.

In this way, the welding part of the work is held, pressurized, and vibrated by the pressure vibrator 111 and jig receiver 112.

The ultrasonic vibrator 130 vibrates at least the contact face of the pressure vibrator 111 that is in contact with the work. Vibrating directions are a direction (horizontal direction) along the surface of the work and a direction (vertical direction) in which the work is pressurized. The ultrasonic vibrator 130 may be an ultrasonic vibration apparatus used for, for example, ultrasonic welding. According to the embodiment, the ultrasonic vibrator conducts two-direction vibration as mentioned above. A vibration frequency and a vibration amplitude are set to break the heat-resistant layer by pressurization and vibration and melt the resin with frictional heat produced by the vibration.

The ultrasonic welding apparatus 100 having such a structure is also used to weld overlapping parts of the two heat-resistant-layered separators 40 outside the electrode (the positive electrode 22 in the present embodiment) when manufacturing the bagged electrode 20 (refer to the welding parts 42 of FIG. 3). In this case, the thickness of the welding part (the part to be welded) is different from that of the case of welding the separators 40 and sheaths 13 together. Accordingly, the height of each projection 121 and the chamfering quantity thereof are changed according to the welding part.

The welding part of the bagged electrode 20 to be manufactured includes only the two heat-resistant-layered separators 40 that are laid on each other. The thickness of one heat-resistant-layered separator 40 is only about 20 to 30 micrometers. Accordingly, the welding part has a thickness of about 40 to 60 micrometers. Therefore, the height of the projection 121 is sufficient if it is equal to or greater than 20 micrometers. Namely, the height of the projection 121 of each of the pressure vibrator 111 and jig receiver 112 is 20 micrometers or greater, i.e., 40 micrometers or greater in total. An upper limit is not particularly set in this case, and therefore, the height is determined so as to realize easy manufacturing. It is sufficient if the upper limit height of the projection 121 of each of the pressure vibrator 111 and jig receiver 112 is set to about twice as large as the thickness of the two heat-resistant-layered separators 40 that are laid on each other.

The chamfering quantity may be small because the projection 121 is small and heat-resistant layer fragments to be removed are thin and small. In consideration of the above-mentioned height of the projection 121, the chamfering quantity is preferably about 0.1 to 1 millimeters in curvature radius.

For manufacturing the bagged electrode 20, the pressure vibrator 111 is configured to have an overall size (the size of the part in contact with a work) not to harm the electrode held between the two heat-resistant-layered separators 40 that are going to be formed into a bag. For this, the size is set to be smaller than the distance from an edge of the electrode to an edge of the two heat-resistant-layered separators 40. There will be no problem if the pressure vibrator 111 protrudes from the edge of the two heat-resistant-layer-provided separators 40.

A secondary battery manufacturing method employing the above-mentioned ultrasonic welding apparatus 100 will be explained.

Figure 8A:
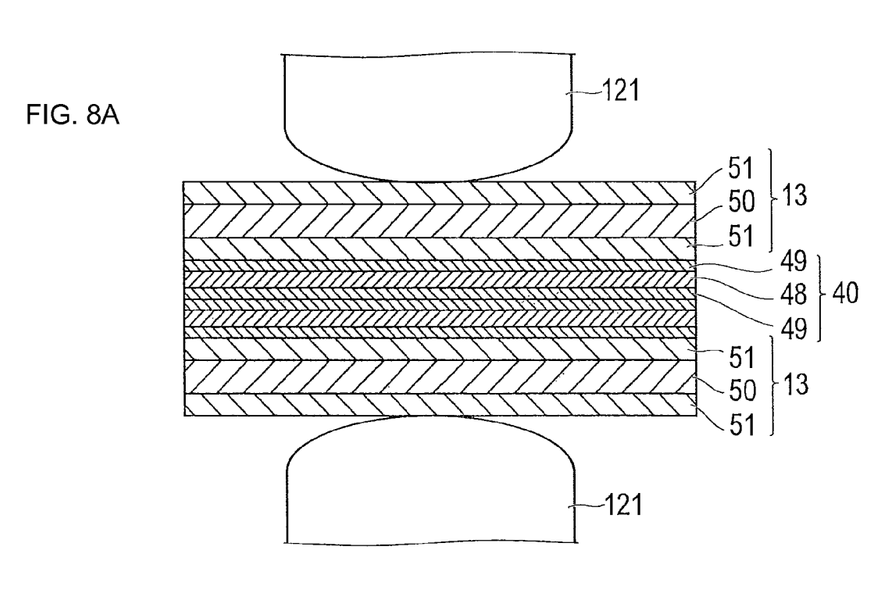
FIG. 8(A) is an enlarged sectional view illustrating an essential part before pressurization and vibration and FIG. 8(B) is an enlarged sectional view illustrating the essential part after the pressurization and vibration.
Figure 8B:
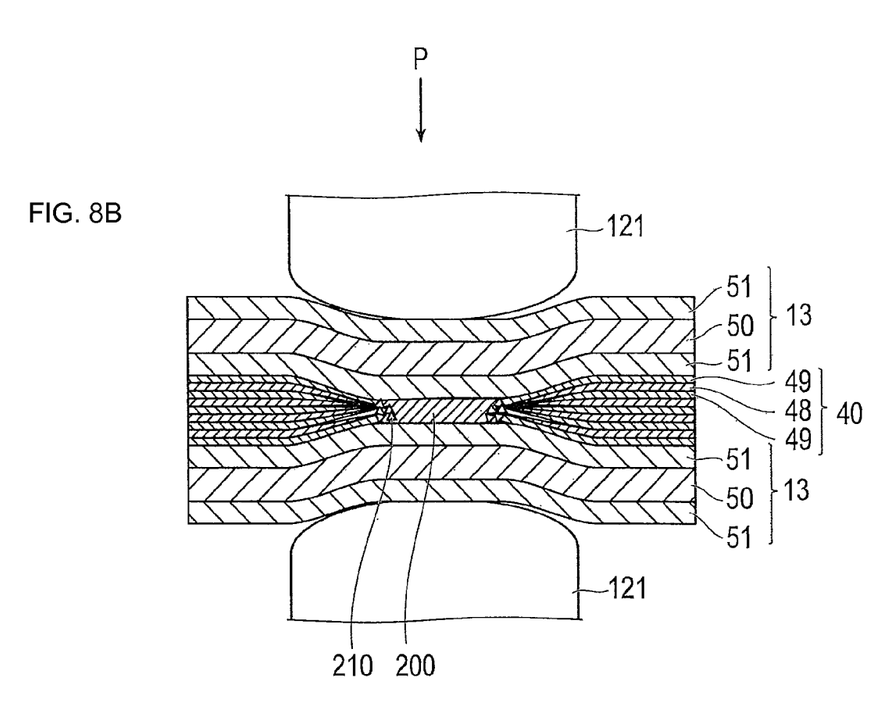

FIG. 8 is an enlarged sectional view illustrating a state that a work is held with the welding jig 110 of the ultrasonic welding apparatus 100, in which FIG. 8(A) is an enlarged sectional view illustrating an essential part before pressurization and vibration and FIG. 8(B) is an enlarged sectional view illustrating the essential part after the pressurization and vibration. The part illustrated in FIG. 8 shows a pair of the projections 121 (one is of the pressure vibrator 111 and the other is of the jig receiver 112) that hold and pressurize the two sheaths 13 and the engaging parts 43 of a plurality of the heat-resistant-layered separators 40 held between the sheaths 13.

As illustrated in FIG. 8(A), the embodiment sets the part to be welded (welding part) of the work between the pressure vibrator 111 and jig receiver 112 of the ultrasonic welding apparatus 100. The part to be welded (welding part) of the work is a part where the engaging parts 43 of the heat-resistant-layered separators 40 are held between the two sheaths 13.

As illustrated in FIG. 8(B), the pressure vibrator 111 is lowered to pressurize the welding part (an arrow P of the drawing). Simultaneously with the pressurization, the ultrasonic vibrator 130 vibrates the pressure vibrator 111. As a result, the heat-resistant layers are pressed from each side of the sheaths, and at the same time, are vibrated.

The pressurization and vibration break the laminated heat-resistant layers 49 in the very small pressurized area up to the central heat-resistant layers 49 in the laminated direction.

At the time of pressurization, the projections 121 push fragments 210 of the broken heat-resistant layers 49 toward the peripheries thereof.

The part (broken part 200) where the heat-resistant layers 49 are broken allows the separator layers 48 to come into contact with each other. Due to the vibration at this time, the sheaths 13, heat-resistant-layered separators 40, and the like in the pressurized area rub one another to generate heat that melts the resin layers 51 of the sheaths 13 and the resin of the separator layers 48 and weld them together. Around the welded part, there are fragments 210 of the heat-resistant layers 49.

This completes the welding to surely fix the engaging parts 43 held between the sheaths 13 to the sheaths 13.

This sort of welding action differs from a welding action of general ultrasonic welding. The general ultrasonic welding welds, for example, two metal plates or resin materials to each other by applying vibration with a horn of an ultrasonic welding apparatus so that the two metal plates or resin materials rub each other. Friction at this time generates heat, and at the rubbed part, molecules join together to achieve welding.

On the other hand, the vibration applied according to the present invention acts, as mentioned above, to break the heat-resistant layers 49. At this time, friction due to the vibration and pressurization are not intended to promote the joining of molecules at the welding part. The heat generated by friction caused by vibration according to the present embodiment does not act by itself to weld frictional faces to each other. The frictional heat of the embodiment only works to melt the resin. This point also differs from the general ultrasonic welding.

Tests were conducted by holding a lamination of heat-resistant-layered separators between sheaths.

The thickness of a welding part (including the sheaths and heat-resistant-layered separators) before welding was 700 micrometers. Welding was carried out with the pressure vibrator 111 having the projections 121 each having the same height as the thickness of the welding part. The front end of the projection 121 was chamfered into a curvature radius of 1.0 millimeters (R=1.0 mm). Vibration directions were two, i.e., horizontal and vertical.

Figure 9:
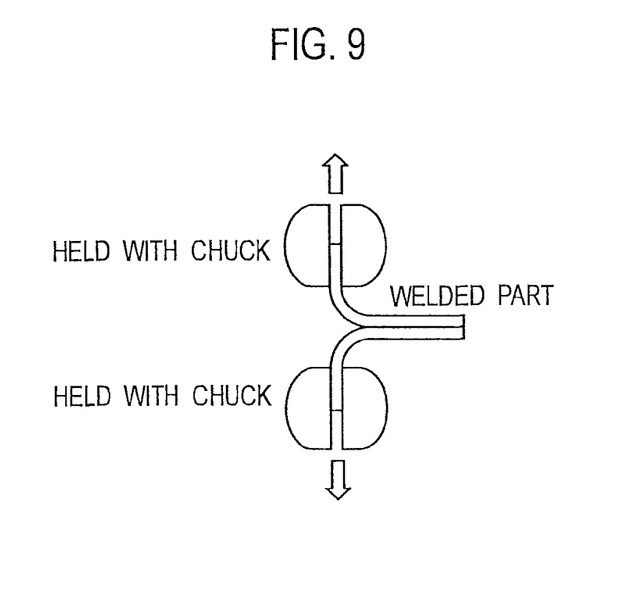
FIG. 9 is a schematic view explaining a method of a peeling test.

A plurality of samples were welded and subjected to a peeling test. The peeling test was conducted as illustrated in FIG. 9 by chucking not-welded (not joined) ends of the sheaths 13 and pulling them away from each other.

Figure 10:
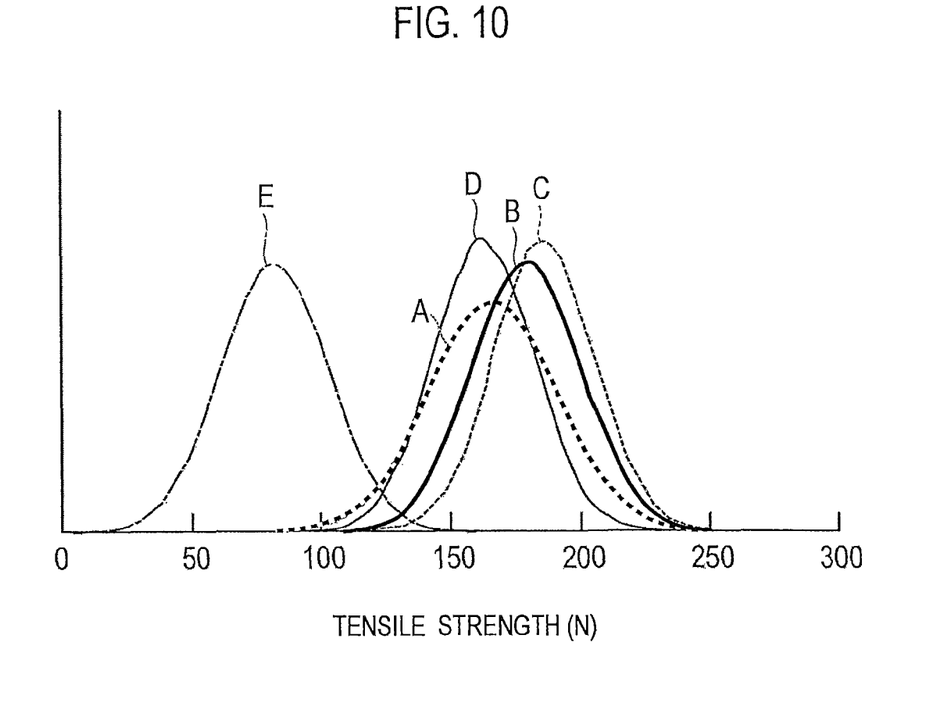
FIG. 10 is a graph illustrating a result of the peeling test.

FIG. 10 is a graph illustrating a result of the peeling test. An abscissa indicates tensile strength and an ordinate occurrence frequency.

In the graph, A to D are samples formed according to the present embodiment and E is a sample thermally welded without vibration with a jig whose work contact face is flat.

As illustrated in the graph, the samples A to D formed according to the present embodiment are higher in tensile strength than the sample E formed without vibration.

A bagged electrode manufacturing method employing the above-mentioned ultrasonic welding apparatus 100 will be explained. Although the manufacturing of a bagged electrode is included in the secondary battery manufacturing method, it is possible to separately carry out the manufacturing of a bagged electrode.

Figure 11A:
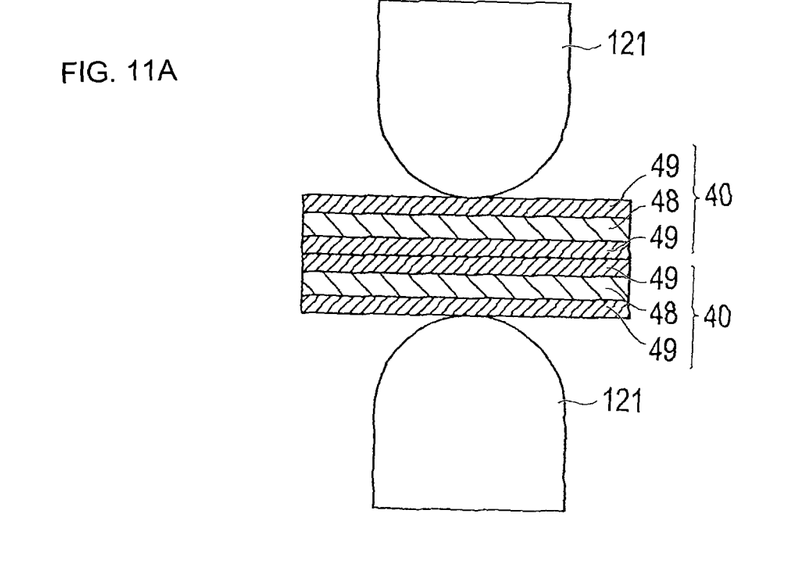
FIG. 11(A) is an enlarged sectional view illustrating an essential part before pressurization and vibration and FIG. 11(B) is an enlarged sectional view illustrating the essential part after the pressurization and vibration.
Figure 11B:
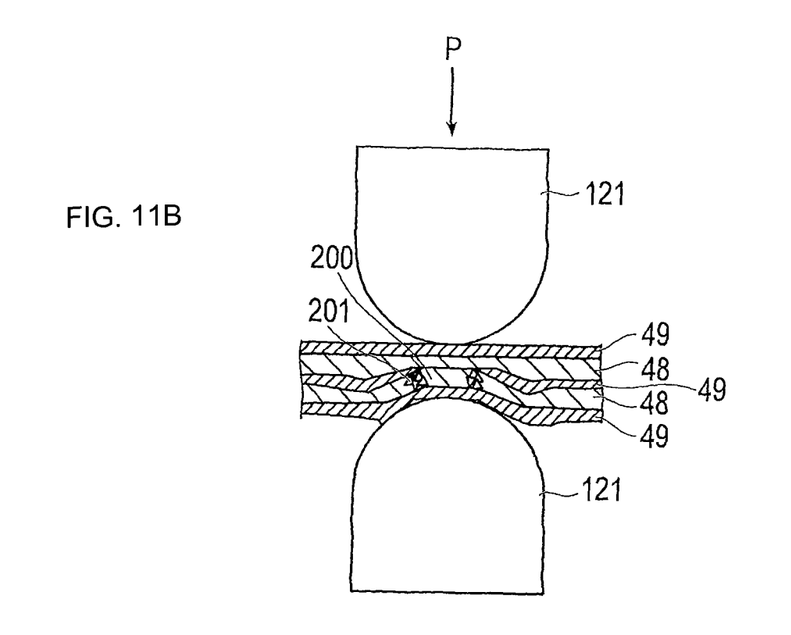

FIG. 11 is an enlarged sectional view illustrating a state that a work is held with the welding jig of the ultrasonic welding apparatus 100, in which FIG. 11(A) is an enlarged sectional view illustrating an essential part before pressurization and vibration and FIG. 11(B) is an enlarged sectional view illustrating the essential part after the pressurization and vibration. The part illustrated in FIG. 11 includes two heat-resistant-layered separators 40 laid on each other and projections 121 that pressurize the part in question.

As illustrated in FIG. 11(A), the embodiment sets a part to be welded (welding part) of the work between the pressure vibrator 111 and jig receiver 112 of the ultrasonic welding apparatus 100. The part to be welded (welding part) of the work is a part where the two heat-resistant-layered separators 40 are stacked on each other.

As illustrated in FIG. 11(B), the pressure vibrator 111 is lowered to pressurize the welding part (an arrow P of the drawing). Simultaneously with the pressurization, the ultrasonic vibrator 130 vibrates the pressure vibrator 111. As a result, inner heat-resistant layers are pressed from each side of the heat-resistant-layered separators, and at the same time, are vibrated. The pressurization and vibration break, in the very small pressurized area, the heat-resistant layers 49 of the heat-resistant-layered separators 40. Due to the pressurization at this time, the projections 121 push fragments 201 of the broken heat-resistant layers 49 toward the peripheries.

The part (broken part 201) where the heat-resistant layers 49 are broken allows the separator layers 48 to come into contact with each other. Due to the vibration at this time, the heat-resistant-layer-provided separators 40 in the pressurized area rub each other to generate heat that melts resin of the separator layers 48 and weld (join) them together. Namely, the heat generated in the rubbing flat area transmits to the separator layers 48 to produce a high temperature to melt and weld the resin.

This completes the welding and the joining parts 42 are formed around the bag-like heat-resistant-layered separators 40 to make the bagged electrode 20.

This sort of welding action is the same as that of the above-mentioned secondary battery manufacturing method.

A test was conducted to stack and weld two heat-resistant-layered separators.

The thickness of a welding part (a total of the two heat-resistant-layered separators) before welding was 50 micrometers. Welding was carried out with the pressure vibrator 111 having the projections 121 each having the same height as the thickness of the welding part. The projection 121 had a cylindrical shape of 0.5 millimeters in diameter. A front end of the projection 121 was chamfered to have a curvature radius of 0.1 millimeters (R=0.1 mm).

A plurality of samples were welded and subjected to a peeling test. The peeling test was conducted like that illustrated in FIG. 9 by chucking not-welded (not joined) ends of the two heat-resistant-layered separators 40 and by pulling them away from each other.

Table 1 illustrates a result of the test. It was examined if a tensile strength with respect to an ultrasonic vibration time was equal to or greater than a predetermined value. The tensile strength is OK if it is about the same as that obtained when thermally welding separators having no heat-resistant layers (with a jig that applies only heat but no vibration and has a flat contact face to a work), LOW if it is lower than that, and HIGH if it is higher than that. OK and HIGH indicate sufficient weld strength. The amplitude is a relative movement with respect to a 100% movement (i.e., a movement of 0.5 millimeters) corresponding to the entire projection 121. Vibration directions were horizontal and vertical (with the same amplitude).

|  | Amplitude (%) | | |
| --- | --- | --- | --- |
| Vibration time (s) | 70 | 80 | 90 |
| 0.05 | LOW | LOW | LOW |
| 0.1 | LOW | LOW | LOW |
| 0.15 | OK | OK | OK |
| 0.2 | HIGH | HIGH | HIGH |

As is understood from the Table 1, adjusting the vibration time results in securing sufficient welding strength similar to that obtained when welding separators having no heat-resistant layers to each other.

The embodiments explained above provide effects mentioned below.

(1) The secondary battery manufacturing method according to the embodiment employs the welding jig 110 having the pressure vibrator 111 and jig receiver 112 provided with the projections 121 on the respective work contact faces and holds, pressurizes, and vibrates a welding part with the welding jig 110. The welding part where the heat-resistant layers 49 and separator layers 48 are laminated on each other is pressurized and vibrated with the projections 121 so that the heat-resistant layers 49 are broken. At the broken part, the resin joins, melts, and welds together due to frictional heat generated by the vibration. As a result, even the welding part where the heat-resistant layers 49 are present can surely be welded.

(2) The secondary battery manufacturing method according to the embodiment forms a front end of the projection 121 into a circular arc shape, or chamfers the same. As a result, fragments of the heat-resistant layers 49 broken by pressurization and vibration are pushed toward the periphery of each projection 121 so that, at the front end part of the projection 121, the resin of the separator layers 48 and sheaths 13 easily joins to promote the welding of the part.

(3) The secondary battery manufacturing method according to the embodiment arranges the projections 121 at opposing positions on the pressure vibrator 111 and jig receiver 112. As a result, the welding part is pushed, pressurized, and vibrated from each side. Even if the welding part is thick, the welding part is surely pressurized and vibrated up to a central part thereof in the laminated direction.

(4) The secondary battery manufacturing method according to the embodiment welds a welding part where the sheaths 13 hold the engaging parts 43 of a plurality of the heat-resistant-layered separators 40 from each side in a laminated direction. The number of the laminated heat-resistant-layered separators 40 is from several tens to several hundreds. Even if the number of the laminated layers is large, the separators and sheaths are surely welded by pressurization and vibration.

(5) The secondary battery manufacturing method according to the embodiment manufactures a bagged electrode by welding a welding part where two heat-resistant-layered separators 40 are laid on each other. When manufacturing the bagged electrode, the heat-resistant layer 49 is always arranged between the separator layers 48 made of resin. The embodiment pressurizes and vibrates the welding part to break the heat-resistant layer 49 between the separator layers 48 and weld the resin of each separator layer 48 to another at the part.

(6) In the secondary battery according to the embodiment, a part to be welded, i.e., a welding part includes the sheaths 13 that hold the engaging parts 43 of the heat-resistant-layered separators 40 from each side in the laminated direction. The welding part is pressurized, vibrated, and welded so that the heat-resistant layers 49 are broken to melt and weld the resin together. Accordingly, the engaging parts 43 of the heat-resistant-layered separators 40 are firmly welded to the sheaths 13, and even if vibration or shock is applied to the secondary battery, the power generation element never moves inside the sheaths 13.

(7) In the secondary battery according to the embodiment, a bagged electrode is manufactured by welding a welding part where two heat-resistant-layered separators 40 are laid on each other. The welding part is pressurized and vibrated to break the heat-resistant layers 49 so that resin at the part melts and welds together. Accordingly, the heat-resistant-layered separators 40 are surely joined together into a bag.

(8) The welding apparatus according to the embodiment includes the welding jig 110 having the pressure vibrator 111 and the jig receiver 112, at least one of the pressure vibrator and jig receiver being provided with the projections 121, and the ultrasonic vibrator to vibrate at least the pressure vibrator 111.

This apparatus is capable of holding, pressurizing, and vibrating, with the pressure vibrator 111 and jig receiver 112 of the welding jig 110, a welding part where the separator layers 48 made of resin and the heat-resistant layers 49 arranged on each other. As a result, the heat-resistant layers 49 in the welding part are broken to weld together the resin of the separator layers 48 in the broken part. The apparatus can surely weld together the heat-resistant-layer-provided separators that are laminated on each other.

(9) The welding apparatus according to the embodiment forms a front end of the projection 121 into a circular arc, or chamfers the same. This configuration pushes fragments of the heat-resistant layers 49 broken by pressurization and vibration toward the periphery of the projection 121, so that the resin of the separator layers 48 and that of the sheaths 13 easily come into contact with each other, thereby promoting the welding of the part.

Although the present invention has been explained in connection with the embodiments and examples, the present invention is not limited to them.

For example, the bagged positive electrode 20 explained above as an example of a bagged electrode contains the positive electrode 22. The electrode contained in the bagged electrode may be the negative electrode 30.

The heat-resistant-layered separator 40 has a three layer structure including the heat-resistant layer 49, separator layer 48, and heat-resistant layer 49. Instead, it may have a two-layer structure including the separator layer 48 and the heat-resistant layer 49 formed only on one face of the separator layer 48. A role of the heat-resistant layer 49 is, as explained already, to prevent direct connection between the positive electrode 22 and the negative electrode 30 even if an internal short circuit occurs to generate heat that melts the separator layer 48. When the heat-resistant-layered separators 40 of two-layer structure each having the heat-resistant layer 49 only on one face of the separator layer 48 are used to pack the positive electrode 22 (or the negative electrode 30) and when the pack is laid on the negative electrode 30 (or the positive electrode 22), the heat-resistant layer 49 is always present between the positive electrode 22 and the negative electrode 30. Accordingly, the heat-resistant-layered separator 40 of two-layer structure can play the role of the heat-resistant layer 49. When using the heat-resistant-layered separators of two-layer structure 40, they are joined (welded) at each joining part 42 so that the heat-resistant layer comes between the two separator layers 48. Namely, the two heat-resistant-layered separators of two-layer structure 40 are arranged so that the heat-resistant layer 49 of at least one of them faces the electrode. In the view point that the heat-resistant-layered separator 40 must prevent the separator layer 48 from melting due to such accidental heat generation, it is preferable that the heat-resistant layer 49 is formed on each face of the separator layer 48 made of resin.

The heat-resistant layer 49 arranged between the separator layer 48 and the electrode is a heat-resistant material that is coated in advance onto a separator material. Instead, the separator layer 48 and heat-resistant layer 49 may be discrete materials.

The projections 121 may be formed only on one of the pressure vibrator 111 and jig receiver 112. In this case, the height of each projection 121 must be greater than the thickness of a welding part because it is formed only on one side. When welding the sheaths 13 and separators 40 together, it is preferable to arrange the projections 121 on each side at opposing positions, although it is dependent on the thickness of the welding part. This is because welding the sheaths 13 and separators 40 together increases the thickness of the welding part in the laminated direction. Accordingly, forming the projections 121 on each side is preferable because the welding part is bitten from each side by the projections 121, and therefore, pressure and vibration are applied up to a central part of the welding part in the laminated direction.

The embodiments mentioned above melt and weld resin with frictional heat generated by vibration. If the frictional heat is insufficient, a heat generator (such as an electric heater or an induction heater) may be employed to heat a contact face between the welding jig and a work.

Although the secondary battery explained in each of the embodiments is a lithium ion secondary battery, the present invention is not limited to the lithium ion secondary battery but is applicable to various types of secondary batteries.

The present invention allows various modifications to be made according to configurations stipulated in the claims and such modifications are also fall in the scope of the present invention.

The present invention pressurizes and vibrates a welding part having a laminated structure in which a plurality of separator layers made of resin and heat-resistant layers are alternately laminated on each other. The pressurization and vibration break the heat-resistant layers in the welding part so that the resin of the separator layers in the broken part joins, melts, and welds together due to frictional heat generated by the vibration. This results in surely welding the welding part including the heat-resistant layers.

The invention claimed is:

1. A secondary battery manufacturing method comprising:
   employing a welding jig that has a pressure vibrator, a jig receiver arranged at a position opposing to the pressure vibrator, and projections formed on both the pressure vibrator and the jig receiver; and
   driving the pressure vibrator to hold and pressurize in a laminated direction and vibrate a welding part having a structure in which a plurality of separator layers of resin and heat-resistant layers interposed among the separator layers are laminated on one another, thereby breaking the heat-resistant layers in the welding part and welding together the resin of the separator layers that joins together in the broken part, wherein an entire front end of each of the projections is shaped into a circular arc.

2. The secondary battery manufacturing method according to claim 1, wherein the projection is arranged at both opposing positions on the pressure vibrator and jig receiver.

3. The secondary battery manufacturing method according to claim 1, wherein:

the welding part further includes a sheath that has a resin layer over the surface thereof and is arranged at each end in the laminated direction of the part; and
the plurality of separator layers of resin and the heat-resistant layers are laminated on each other and the pressure vibrator and jig receiver hold, pressurize, and vibrate each sheath from a face of the sheath that is on an outer side in the laminated direction.

4. The secondary battery manufacturing method according to claim 1, wherein
   the welding part is a part having a lamination of a plurality of heat-resistant-layered separators including a plurality of separator layers and heat-resistant layers coated on each face of each separator layer, and
   the pressure vibrator and jig receiver hold, pressurize, and vibrate the lamination of the heat-resistant-layered separators from each outer side in the laminated direction.

5. A secondary battery manufactured according to the secondary battery manufacturing method as set forth in claim 3, further comprising:
   sheaths each having a resin layer on the surface thereof; and
   a power generation element covered with the sheaths, wherein
   the power generation element includes a positive electrode and negative electrode that are laminated on each other with a heat-resistant-layered separator interposed therebetween, a part of an end of the separator is held between the sheaths at a part of the periphery of the sheaths, a heat-resistant layer of the separator at the held part is broken, and the resin layers of the sheaths and resin of the separator are welded together at the broken part.

6. A secondary battery manufactured according to the secondary battery manufacturing method as set forth in claim 4, further comprising:
   a bagged electrode including one of positive and negative electrodes between two heat-resistant-layered separators formed into a bag, wherein
   heat-resistant layers of the separators positioned at a part of an area where the bag-like heat-resistant-layered separators are laid on each other outside the electrode held between the separators are broken so that resin of the separators at the broken part is welded together.

* * * * *